(12) United States Patent
Mao et al.

(10) Patent No.: US 10,148,161 B2
(45) Date of Patent: Dec. 4, 2018

(54) VIBRATION MOTOR

(71) Applicants: Lubin Mao, Shenzhen (CN); Fei Hou, Shenzhen (CN)

(72) Inventors: Lubin Mao, Shenzhen (CN); Fei Hou, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 337 days.

(21) Appl. No.: 15/254,298

(22) Filed: Sep. 1, 2016

(65) Prior Publication Data

US 2017/0117791 A1    Apr. 27, 2017

(30) Foreign Application Priority Data

Oct. 23, 2015    (CN) ..................... 2015 2 0830383 U

(51) Int. Cl.
| | |
|---|---|
| *H02K 33/16* | (2006.01) |
| *H02K 33/02* | (2006.01) |
| *H02K 1/34* | (2006.01) |
| *H02K 5/04* | (2006.01) |

(52) U.S. Cl.
CPC ............... *H02K 33/02* (2013.01); *H02K 1/34* (2013.01); *H02K 5/04* (2013.01); *H02K 33/16* (2013.01)

(58) Field of Classification Search
CPC ........ H02K 33/00; H02K 33/02; H02K 33/12; H02K 33/16; H02K 33/18; H02K 1/34; H02K 5/04

See application file for complete search history.

(56) References Cited

U.S. PATENT DOCUMENTS

| 6,836,039 | B2 * | 12/2004 | Choi | .................... | H02K 5/1677 |
| | | | | | 310/81 |
| 7,157,823 | B2 * | 1/2007 | Noguchi | .............. | H02K 5/1675 |
| | | | | | 310/81 |
| 2017/0117788 | A1 * | 4/2017 | Hou | .......................... | H02K 1/34 |
| 2017/0117790 | A1 * | 4/2017 | Mao | .......................... | H02K 1/34 |
| 2017/0117793 | A1 * | 4/2017 | Mao | ....................... | H02K 99/20 |
| 2017/0120298 | A1 * | 5/2017 | Mao | ....................... | B06B 1/045 |

\* cited by examiner

*Primary Examiner* — Dang Le

(74) *Attorney, Agent, or Firm* — Na Xu; IPro, PLLC

(57) ABSTRACT

A vibration motor includes a housing having an accommodation space, a cover plate connecting with the housing, a first vibration system and a second vibration system supported in the accommodation space elastically. The first vibration system includes a first weight and at least one permanent magnet. The second vibration system includes a second weight and at least one coil. A first limiting block is arranged on the cover plate, and a second limiting block is arranged on the bottom wall of the said housing. A first limiting hole corresponding to the first limiting block is formed for receiving at least part of the first limiting block; and a second limiting hole corresponding to the second limiting block is formed for receiving part of the second limiting block.

7 Claims, 2 Drawing Sheets

VIBRATION MOTOR

FIELD OF THE INVENTION

The present application is related to a motor, especially to a vibration motor applicable for a portable electronic product.

DESCRIPTION OF RELATED ART

The vibration motor is applied to feedback of the system generally, such as incoming call prompt, message prompt and navigation prompt of mobile phone, vibration feedback of game player, etc. for the portable consumer electronic products which are favored by more and more people along with development of the electronic technologies, such as mobile phone, handheld game player, navigation unit or handheld multimedia entertainment equipment, etc. Thus, the vibration motor is required to have excellent performance, long service life and small dimensions as a result of such wide application.

The vibration motor applied to the portable consumer electronic products so far comprises a housing, a base forming an accommodation space after being assembled with the housing and a single vibration system usually. The vibration motor having this traditional structure also has one resonant frequency only because one vibration system has one natural resonant frequency only; and two vibration motors shall be taken if two resonant frequencies are required to carry out on the terminal using this vibration motor; in this way, the space occupied by the vibration motor shall be improved greatly inevitably, and it is not good for development of the existing terminal in the direction of miniature.

For this reason, it is necessary to provide a new vibration motor to solve the technical problems above.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

Figure 1:
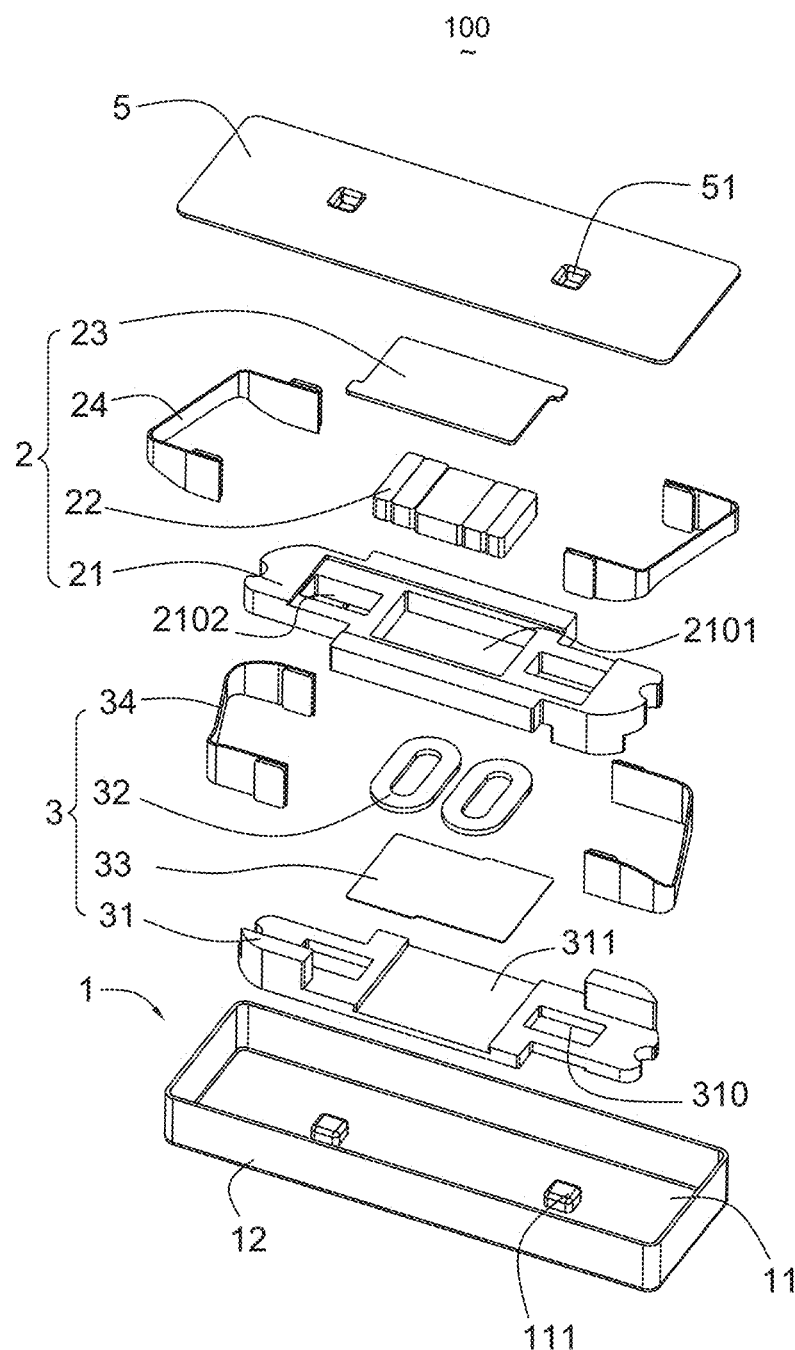
FIG. 1 is an isometric and exploded view of a vibration motor in accordance with an exemplary embodiment of the present disclosure.
Figure 2:
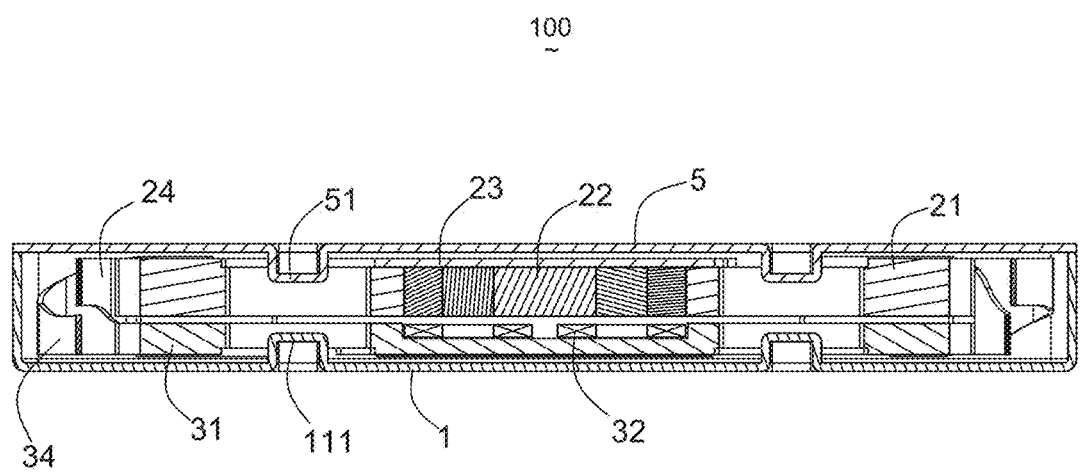
FIG. 2 is a cross-sectional view of the assembled vibration motor in FIG. 1.

As shown in FIGS. 1-2, a vibration motor 100, in accordance with an exemplary embodiment of the present disclosure, includes a housing 1 having an accommodation space, a cover plate 5 connecting with the housing 1, a first vibration system 2 accommodated in the accommodation space and including at least one permanent magnet 22, and a second vibration system 3 accommodated in the accommodation space and including at least one coil 32. The coil 32 and the permanent magnet 22 are arranged opposed to each other. The first vibration system 2 and the second vibration system 3 are driven to vibrate in the housing 1 by means of interaction of the coil 32 and the permanent magnet 22.

The housing comprises a bottom wall 11 and a side wall 12 extending perpendicularly from the bottom wall 11 thereby forming the accommodation space. Moreover, the side wall 12 is connected with the cover plate 5 thereby forming a protection structure of the vibration motor with the housing 1.

The vibration motor 100 further comprises one pair of first elastic supports 24 and a pair of second elastic support 34. The first vibration system 2 is supported in the accommodation space elastically by the first elastic supports 24. The second vibration system 3 is supported in the accommodation space elastically by the second elastic supports 34.

The first vibration system comprises a first weight 21 having an accommodation hole 2101 for accommodating the permanent magnet 22. In this embodiment, the permanent magnet 22 includes five permanent magnets which are arranged abreast. Of course, the amount of the magnets and the arrangement are not limited to what has been described as long as the magnetic field can be generated to drive the first vibration system 2 and the second vibration system 3 to vibrate in the horizontal direction.

The first vibration system 2 further comprises a first pole plate 23 adhered to the first weight 21. Moreover, the first pole plate 23 is attached to the surface of the first weight 21 close to one side of the cover plate for covering the permanent magnet 22.

The second vibration system 3 comprises a second weight 31 having an accommodation groove 311 for accommodating the coil 32. In this embodiment, the coil 32 comprises two coils 32 which are arranged abreast along the vibration direction and in the identical accommodation groove 311. Of course, other quantities or other arrangement forms shall be allowable, such as multiple accommodation grooves shall be feasible. Preferably the present application is characterized in that the coil 32 is the flat and circular coil; and the interaction shall be formed between the magnetic field when the coil 32 is powered on and the permanent magnet 22.

The second vibration system 3 further comprises a second pole plate 33 attached to the second weight 31. Moreover, the second pole plate 33 is attached to the surface of the second weight 31 close to one side of the bottom wall 11 of the housing; and the coil 22 is covered by a project of the second pole plate 33 on one side of the accommodation groove 311 of the second weight 31.

One end of the first elastic support 24 is fixed on the housing 1, and the other end is fixed on the first weight 21; one end of the second elastic support 34 is fixed on the housing 1, and the other end is fixed on the second weight 31. The first elastic support 24 and the second elastic support 34 refer to U-shaped springs in the present application; and in fact, the shapes of the first elastic support 24 and the second elastic support 34 are not limited to certain specific structure, and V-shaped spring, spiral spring, etc. shall be allowable as long as the first vibration system 2 and the second vibration system 3 can be supported elastically, and the first elastic support 24 and the second elastic support 34 are suspended in the accommodation space of the housing 1 and provide the elastic reset forces.

A first limiting block 51 which protrudes toward the first vibration system 2 is arranged on the cover plate 5; correspondingly, a first limiting hole 2102 is arranged on the first weight 21 and penetrates the first weight along a direction perpendicularly to the vibration direction. Two first limiting holes 2102 are positioned on two sides of the accommodation hole 2102 respectively. At least one part of the first limiting block 51 is arranged in the first accommodation hole 2102, thereby limiting the vibration of the first vibration system 2. Similarly, a second limiting block 111 which protrudes to the direction of a second vibrator 3 is arranged on the bottom wall 11 of the housing; correspondingly, a second limiting hole 310 is arranged on the second weight 31. Two second limiting holes 310 which are positioned on two sides of the accommodation groove 311 respectively. At least one part of the second limiting block 111 is arranged in the second accommodation hole 310, thereby limiting the second vibration system 3. The first limiting block 51 and the second limiting block 111 are formed by means of stamping. In the embodiment, the first limiting hole 2102 and the second limiting hole 310 are through holes running through the weights.

The beneficial effects of the present application are as follows: the convex limiting blocks are arranged on the housing and the cover plate for the vibration motor of the present application; the limiting holes corresponding to the limiting blocks are arranged on the first vibration system and the second vibration system; therefore, the vibration motor is limited, and the reliability of the product is improved.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vibration motor including:
    a housing having an accommodation space, and including a bottom wall and a side wall extending perpendicularly from the bottom wall;
    a cover plate engaging with the housing;
    a first vibration system suspended in the accommodation space and positioned close to the cover plate, the first vibration system comprising at least one permanent magnet;
    a second vibration system suspended in the accommodation space and opposed to the first vibration system, the second vibration system positioned on one side close to the bottom wall of the housing, the second vibration system comprising at least one coil;
    a first limiting block on the cover plate and formed by stamping and protruding toward the first vibration system;
    a second limiting block on the housing and formed by means of stamping and protruding toward the second vibration system;
    a first limiting hole arranged in the first vibration system facing one side of the cover plate;
    a second limiting hole in the second vibration system facing one side of the bottom wall;
    wherein at least one part of the first limiting block is arranged in the first limiting hole, and at least one part of the second limiting block is arranged in the second limiting hole.

2. The vibration motor as described in claim 1, wherein the first vibration system comprises a first weight, and the first limiting hole penetrates the first weight.

3. The vibration motor as described in claim 2, wherein the first weight is equipped with an accommodation hole for accommodating the permanent magnet and penetrates the first weight; and the first limiting hole is positioned at two sides of the accommodation hole.

4. The vibration motor as described in claim 3, wherein the first vibration system comprises a first elastic support having one end fixed on the housing and another end fixed on the first weight.

5. The vibration motor as described in claim 1, wherein the second vibration system comprises a second weight, and the second limiting hole penetrates the second weight.

6. The vibration motor as described in claim 5, wherein the second weight is equipped with an accommodation groove for accommodating the coils; the second limiting hole is positioned at two sides of the accommodation groove.

7. The vibration motor as described in claim 6, wherein the second vibration system comprises a second elastic support having end fixed on the housing and another end fixed on the second weight.

* * * * *